US012769513B2

(12) United States Patent
Warner et al.

(10) Patent No.: US 12,769,513 B2
(45) Date of Patent: Oct. 20, 2026

(54) MULTI-DIE DOT-PRODUCT ENGINE TO PROVISION LARGE SCALE MACHINE LEARNING INFERENCE APPLICATIONS

(71) Applicant: Hewlett Packard Enterprise Development LP, Spring, TX (US)

(72) Inventors: Craig Warner, Coppell, TX (US); Eun Sub Lee, Frisco, TX (US); Sai Rahul Chalamalasetti, Milpitas, CA (US); Martin Foltin, Fort Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 156 days.

(21) Appl. No.: 18/601,259

(22) Filed: Mar. 11, 2024

(65) Prior Publication Data

US 2024/0211212 A1 Jun. 27, 2024

Related U.S. Application Data

(63) Continuation of application No. 17/017,557, filed on Sep. 10, 2020, now Pat. No. 11,947,928.

(51) Int. Cl.
*G06F 7/544* (2006.01)
*G06F 9/38* (2018.01)
(Continued)

(52) U.S. Cl.
CPC .......... *G06F 7/5443* (2013.01); *G06F 9/3867* (2013.01); *G06F 9/522* (2013.01); *G06F 40/20* (2020.01); *G06N 3/063* (2013.01)

(58) Field of Classification Search
CPC ...... G06F 7/5443; G06F 9/3867; G06F 9/522; G06F 40/20; G06F 2207/4824;
(Continued)

(56) References Cited

U.S. PATENT DOCUMENTS

| | | | |
|---|---|---|---|
| 10,262,733 B2 | 4/2019 | Yang et al. |
| 10,515,303 B2 | 12/2019 | Lie et al. |

(Continued)

FOREIGN PATENT DOCUMENTS

| | | |
|---|---|---|
| DE | 102018129112 A1 | 6/2019 |
| WO | 2018/126073 A1 | 7/2018 |

OTHER PUBLICATIONS

Ardestani, A.S., "Design and Optimization of Hardware Accelerators for Deep Learning," A dissertation submitted to the faculty of The University of Utah in partial fulfillment of the requirements for the degree of Doctor of Philosophy In Computer Science, May 2018, 125 pgs.

(Continued)

*Primary Examiner* — Paul Dinh
(74) *Attorney, Agent, or Firm* — Dickinson Wright

(57) ABSTRACT

Systems and methods are provided for a multi-die dot-product engine (DPE) to provision large-scale machine learning inference applications. The multi-die DPE leverages a multi-chip architecture. For example, a multi-chip interface can include a plurality of DPE chips, where each DPE chip performs inference computations for performing deep learning operations. A hardware interface between a memory of a host computer and the plurality of DPE chips communicatively connects the plurality of DPE chips to the memory of the host computer system during an inference operation such that the deep learning operations are spanned across the plurality of DPE chips. Due to the multi-die architecture, multiple silicon devices are allowed to be used for inference, thereby enabling power-efficient inference for large-scale machine learning applications and complex deep neural networks. The multi-die DPE can be used to build a multi-device DNN inference system performing specific applications, such as object recognition, with high accuracy.

20 Claims, 7 Drawing Sheets

(51) Int. Cl.
*G06F 9/52* (2006.01)
*G06F 40/20* (2020.01)
*G06N 3/063* (2023.01)

(58) Field of Classification Search
CPC ...... G06F 15/163; G06N 3/063; G06N 3/045; G06N 3/0464; G06N 3/08; G06N 5/04; G06N 20/20
USPC .......................................................... 716/100
See application file for complete search history.

(56) References Cited

U.S. PATENT DOCUMENTS

| | | | |
|---|---|---|---|
| 2017/0178725 | A1 | 6/2017 | Yang et al. |
| 2018/0139153 | A1 | 5/2018 | Moradi et al. |
| 2019/0042251 | A1 | 2/2019 | Nurvitadhi et al. |
| 2019/0042529 | A1 | 2/2019 | Nurvitadhi et al. |
| 2019/0235889 | A1 | 8/2019 | Ndu et al. |
| 2019/0303033 | A1 | 10/2019 | Noguera Serra et al. |
| 2019/0347125 | A1 | 11/2019 | Sankaran et al. |
| 2020/0104692 | A1 | 4/2020 | Hill et al. |
| 2020/0159811 | A1 | 5/2020 | Chatterjee et al. |
| 2021/0103550 | A1 * | 4/2021 | Appu .................... G06F 9/3001 |
| 2021/0397932 | A1 | 12/2021 | Yudanov et al. |

OTHER PUBLICATIONS

Chen et. al., "The Best of Both Worlds: Combining Recent Advances in Neural Machine Translation", Proceedings of the 56th Annual Meeting of the Association for Computational Linguistics (Long Papers), Jul. 15-20, 2018, pp. 76-86.

He et. al., "Deep Residual Learning for Image Recognition", Dec. 10, 2015, pp. 1-12.

Howard et. al., "MobileNets: Efficient Convolutional Neural Networks for Mobile Vision Application", Apr. 17, 2017, pp. 1-9.

* cited by examiner

MULTI-DIE DOT-PRODUCT ENGINE TO PROVISION LARGE SCALE MACHINE LEARNING INFERENCE APPLICATIONS

The present application is a continuation application of U.S. patent application Ser. No. 17/017,557 filed on Sep. 10, 2020.

CROSS-REFERENCE TO RELATED APPLICATIONS

This application is a continuation application of and claims priority to application Ser. No. 17/017,557, filed on Sep. 10, 2020, the contents of which are hereby incorporated by reference in their entireties.

DESCRIPTION OF RELATED ART

Deep learning is an approach that is based on the broader concepts of artificial intelligence and machine learning (ML). Deep learning can be described as imitating biological systems, for instance the workings of the human brain, in learning information and recognizing patterns for use in decision making. Deep learning often involves artificial neural networks (ANNs), wherein the neural networks are capable of supervised learning from labeled data or unsupervised learning from data that is unstructured or unlabeled. In an example of deep learning, a computer model can learn to perform classification tasks directly from images, text, or sound. As technology in the realm of AI progresses, deep learning models (e.g., trained using a large set of data and neural network architectures that contain many layers) can achieve state-of-the-art accuracy, sometimes exceeding human-level performance. Due to this growth in performance, deep learning can have a variety of practical applications, including function approximation, classification, data processing, image processing, robotics, automated vehicles, and computer numerical control.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
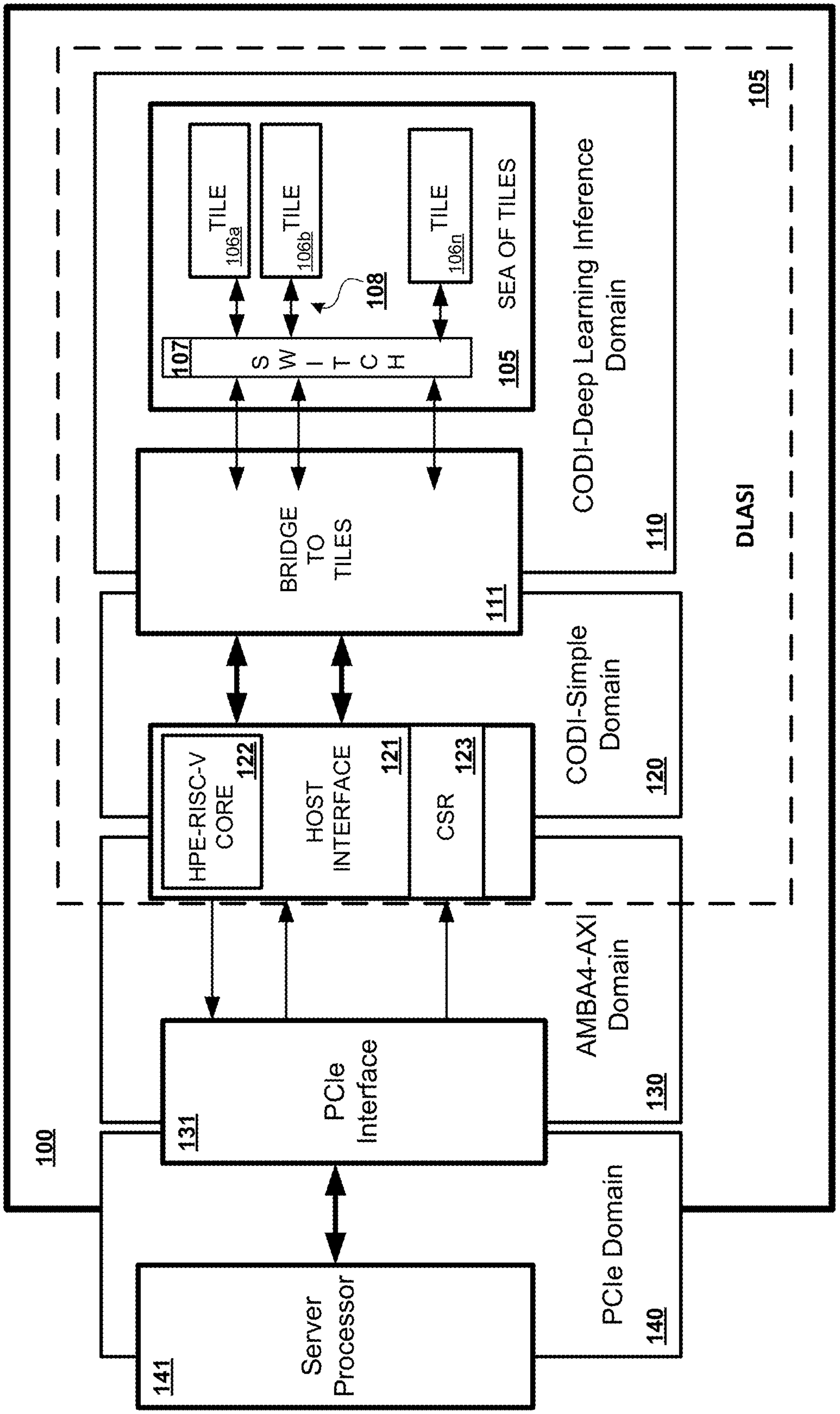
FIG. 1 depicts an example of a deep learning accelerator system, including a deep learning accelerator system interface (DLASI) to connect multiple inference computation units to a host memory, according to some embodiments.

The figures are not exhaustive and do not limit the present disclosure to the precise form disclosed.

DETAILED DESCRIPTION

Various embodiments described herein are directed to a multi-die dot-product engine to provision large-scale machine learning inference applications. Dot-Product Engine (DPE) technology and the Programmable Ultra-efficient Memristor-based Accelerator (PUMA) deep neural network (DNN) inference architecture, which are currently used in implementing deep learning hardware accelerators, are highly energy-efficient. However, these technologies utilize an on-die weight storage approach, which is central to these architectures. The on-die weight storage approach can limit the DNN size, especially where the hardware is implemented on a single silicon device. In order to address this drawback, the disclosed multi-die dot-product engine is distinctly designed to leverage a multi-chip architecture for DPE. Due to the multi-die architecture, multiple silicon devices may be implemented for inference, thereby enabling power-efficient inference for large-scale ML applications and complex DNNs. As technology continues to progress, the size and complexity of DNNs may also increase to accommodate a wide range of applications in growth markets, such as autonomous driving, natural language processing, network security, or any number of other applications.

As will be described herein, the disclosed multi-die dot-product engine is a part of a multi-device DNN inference system that is capable of performing object recognition with high accuracy. Furthermore, according to the embodiments, the system can include an enhanced system interface that is Scalable IOV compliant, so hyperconverged servers can deploy expansion cards as needed. Also, the blocks used in the disclosed examples systems are designed for integration in Application Specific Integrated Circuits (ASICs).

As alluded to above, DPE technology can be used to implement a deep learning accelerator system. For instance, a deep learning accelerator system including a deep learning accelerator system interface (DLASI) is described herein. The DLASI is designed to provide a high bandwidth, low latency interface between cores (e.g., used for inference) and servers that may otherwise not have communicative compatibility (with respect to memory). Designing an accelerator made up of thousands of small cores can have several challenges, such as: coordination among the many cores, maintaining high efficiency of the accelerator in spite of radically different problem sizes associated with DNN inferences, and completing these DNN-based computational tasks without consuming too much of the power or die area. In general, coordinating thousands of Neural Network Inference cores may strain a single host interface controller such that the controller may become a performance bottleneck.

Furthermore, the sizes of different neural networks can vary substantially. Some neural networks can only have a few thousand weights, while other neural networks, such as those used in natural language processing or image recognition, may have over 100 million weights. Using large accelerators for every application may appear to be a viable brute-force solution. On the other hand, if a large accelerator is assigned to work on a small neural network, the accelerator may be underutilized. Furthermore, modern servers host many Operating Systems (OS)es and only have capacity for a few expansion cards. For example, a server may have multiple PCIe card slots per processor socket. Mapping large neural networks onto a single die presents a number of challenges, for there may not be enough on-die storage to hold each weight. Thus, a multi-chip interface solution including a multi-die dot-product engine (DPE) to provision-large scale machine learning inference applications is described herein. As another example, a PCIE switch can be used on a PCIE form factor card with multiple die interacting with it to map large models. Hence, even with a limited number of PCIE lanes, large models can still be mapped on a single PCIE card by utilizing multiple DPE dies.

Typically, commodity servers (e.g. Xeon-based), personal computers (PCs), and embedded systems such as Raspberry Pi, run standardized operating systems and incorporate complex general purpose CPUs and cacheable memory systems. However, deep learning processors can achieve high performance with much simpler instruction set and memory architecture. In addition, a core's architecture is optimized for processing smaller numbers, for instance handling 8 bit numbers in operation (as opposed to 32 bits or 64 bits) for neural network inference. The hardware design for a deep learning accelerator can include a substantially large number of processors, for instance using thousands of deep learning processors. Also, with being employed by the thousands, these deep learning processors may not require high precision, generally. Thus, processing small numbers may be optimal for its multi-core design, for instance to mitigate bottlenecks. In contrast, commodity servers can run very efficiently handling larger numbers, for instance processing 64 bits. Due to these (and other) functional differences, there may be some incongruity between the accelerator cores and the servers during deep learning processing. The disclosed DLASI is designed to address such concerns, as alluded to above. The DLASI realizes a multi-die solution that efficiently connects the different types of processing (performed at the accelerator cores and in the host servers) for interfacing entities in the accelerated system, thereby improving compatibility and enhancing the system's overall performance.

According to some embodiments, the DLASI includes a fabric protocol, a processor-based host interface, and a bridge that can connect a server memory system, viewing memory as an array of 64 byte (B) cache lines, to a large number of DNN inferences computational units, namely the cores (tiles) that view memory as an array of 16-bit words. The fabric protocol can be two virtual channel (VC) protocol, which enables the construction of simple and efficient switches. The fabric protocol can support large packets, which in turn, can support high efficiencies. Additionally, with simple ordering rules, the fabric protocol may be extended to multiple chips. Even further, in some cases, the fabric protocol can be layered on top of another protocol, such as Ethernet, for server to server communication. Furthermore, the host interface, in some examples, may interface with the server at an "image" level (or input data sequence level), and can pipeline smaller segments of work from the larger level, in a "spoon feeding" fashion, to the multiple cores. This is accomplished by applying a synchronization scheme, referred to herein as overlapping interval pipelining. Overlapped interval pipelining can be generally described as a connection of send and barrier instructions. This pipelining approach enables each of the inference computation units, such as tiles, to be built with a small amount of on-die memory (e.g., 7 nm ASIC, 1 card, 2 die, 128 tiles), and synchronizes work amongst tiles in a manner that minimizes idleness of tiles (thereby optimizing processing speed).

FIG. 1 is an example block diagram of a deep learning accelerator 100, including the DLASI 105. The deep learning accelerator 100 can be implemented as hardware, for example as a field programmable gate array (FPGA) or other form of integrated circuit (IC) chip (such as an Application Specific Integrated Circuit—ASIC). As an FPGA, the accelerator 100 can include digital math units (as opposed to memristor-based analog compute circuits). The deep learning accelerator 100 can have an architecture that allows for a diverse range of deep learning applications to be run on the same silicon. As shown in FIG. 1, the DLASI (indicated by the dashed line box) can be a conceptual collective of several components, including: the DLI fabric protocol links 108; the host interface 121; bridge 111; and switch 107. The deep learning accelerator 100 has an architecture that is segmented into four domains, including: a CODI-Deep Learning Inference domain 110; a CODI-Simple domain 120; a AMBA4-AXI domain 130; and a Peripheral Component Interconnect Express (PCIe) domain 140. Additionally, FIG. 1 serves to illustrate that the DLASI 105 can be implemented as an on-die interconnect, allowing the disclosed interface to be a fully integrated and intra-chip solution (with respect to the accelerator chip).

The PCIe domain 140 is shown to include a communicative connection between a server processor 141. The PCIe domain 140 can include the PCIe interface 131, as a high-speed interface for connecting the DLI inference chip to a host processor, for example a server processor. For example, a motherboard of the server can have a number of PCIe slots for receiving add-on cards. The server processor 141 can be implemented in a commodity server that is in communication with the tiles 106*a*-106*n* for performing deep learning operations, for example image recognition. The server processor 141 may be implemented as a rackmount server or a blade server, such as a Xeon server, a ProLiant server, and the like. As alluded to above, by supporting a multi-card configurations, larger DNNs can be supported by the accelerator 100. For a small number of FPGAs or ASICs (e.g., four FPGAs) it would be possible to use the PCIe: peer to peer mechanism. In some cases, a PCIe link may not be able to deliver enough bandwidth and dedicated FPGA to FPGA (or ASIC to ASIC) links may be utilized.

In the illustrated example, the CODI-Deep Learning Inference domain 110 includes the sea of tiles 105, plurality of tiles 106*a*-106*n*, switch 107, and bridge 111. As seen, the sea of tiles 10 is comprised of multiple tiles 106*a*-106*n* that are communicably connected to each other. Each tile 106*a*-106*n* is configured as a DNN inference computation unit, capable of performing tasks related to deep learning, such as computations, inference processing, and the like. Thus, the sea of tiles 105 can be considered an on-chip network of tiles 106*a*-106*n*, also referred to herein as the DLI fabric. The CODI-DLI domain 110 includes a CODI interconnect used to connect the tiles to one another and for connecting the tiles to a host interface controller 121.

Each of the individual tiles 106*a*-106*n* can further include multiple cores (not shown). For example, a single tile 106*a* can include 16 cores. Further, each core can include Matrix-Vector-Multiply-Units (MVMU). These MVMUs can be implemented using resistive memory (e.g., memristor) based cross-bars for in-memory analog computation, or with digital circuits that include static random-access memory (SRAM) for storage of neural network weights and digital multiplier/adders (as opposed to memristors) employed for the computation. In an embodiment, the core can implement a full set of instructions, and employs four 256×256 MVMUs. The cores in the tile are connected to a tile memory. Accordingly, the tile memory for tile 106*a*, for instance, can be accessed from any of the cores which reside in the tile 106*a*. The tiles 106*a*-106*n* in the sea of tiles 105 can communicate with one another by sending datagram packets to other tiles. The tile memory has a unique feature for managing flow control—each element in the tile memory has a count field which is decremented by reads and set by writes. Also, each of the tiles 106*a*-106*n* can have an on-die fabric interface (not shown) for communicating with the other tiles, as well as the switch 107. The switch 107 can provide tile-to-tile communication.

Accordingly, there is an on-die interconnect which allows the inference chip to interface with the PCIe domain 140. The CODI-Deep Learning Inference domain 110 is a distinct fabric connecting many compute units to one another.

The deep learning inference (DLI) fabric protocol links 108 are configured to provide communicative connection in accordance with the DLI fabric protocol. The DLI fabric protocol can use low-level conventions, for example those set forth by CODI. The DLI fabric protocol can be a 2 virtual channel (VC) protocol which enables the construction of simple and efficient switches. The switch 107 can be a 16-port switch, which serves as a building block for the design. The DLI fabric protocol can be implemented as a 2-VC protocol by having higher level protocols designed in a way that ensures the fabric stalling is infrequent. The DLI fabric protocol supports a large identifier (ID) space, for instance 16 bits, which in turn, supports multiple chips that may be controlled by the host interface 121. Furthermore, the DLI fabric protocol may use simple ordering rules, allowing the protocol to be extended to multiple chips.

The DLASI 105 also includes a bridge 111. As a general description, the bridge 111 can be an interface that takes packets from one physical interface, and transparently routes them to another physical interface, facilitating a connection therebetween. The bridge 111 is shown as an interface between the host interface 121 in the CODI-simple domain 120 and the switch 107 in the CODI-deep learning inference domain 110, bridging the domains for communication. Bridge 111 can ultimately connect a server memory (viewing memory as an array of 64B cache lines) to the DLI fabric, namely tiles 106*a*-106*n* (viewing memory as an array of 16-bit words). In embodiments, the bridge 111 has hardware functionality for distributing input data to the tiles 106*a*-106*n*, gathering output and performance monitoring data, and switching from processing one image (or input data sequence) to processing the next.

The Host interface 121 supplies input data and transfers output data to the host server memory. To enable simple flow control the host interface may declare when the next interval occurs, and is informed when a tile's PUMA cores have all reached halt instructions. When the host interface declares the beginning of the next interval each tile sends its intermediate data to the next set of tiles performing computation for the next interval.

In an example, when a PCIe card boots, a link in the PCIe domain 140 is trained. For example, the link in the PCIe domain 140 can finish training, clocks start and the blocks are taken out of reset. Then, the blocks in the card may be initialized. Then, when loading a DNN onto the card, the matrix weights, core instructions, and/or tile instructions may be loaded.

Figure 2:
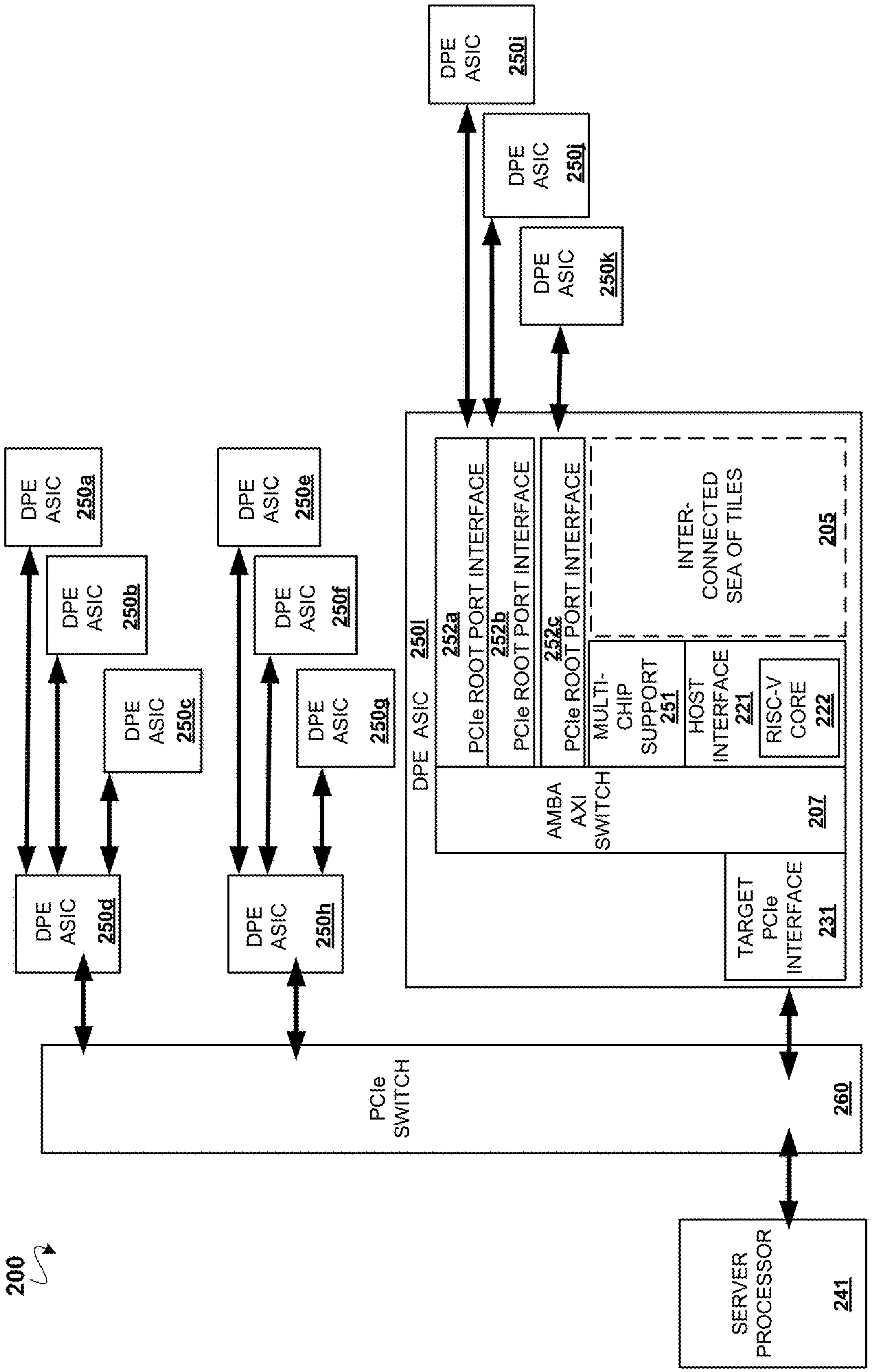
FIG. 2 illustrates an example architecture for a multi-chip interface system including a multi-die dot-product engine (DPE) to provision-large scale machine learning inference applications, according to some embodiments.

Referring now to FIG. 2, an example architecture of a multi-chip interface system 200 including multiple DPE dies 250*a*-250*l* is depicted. As background, ML has become an integral part of the modern life, automating various complicated decision-making processes. Due to the data-intensive and Matrix Vector Multiplication (MVM)-operation-heavy nature of the ML algorithms, the conventional CMOS hardware may provide limited performance at scale. Therefore, the adaptation of the resistive memory technology, such as memristors, to perform computations in parallel—by storing weights of the memristors—was used as a viable alternative. Yet, with the increasing complexity of the ML algorithms, the compute intensity and size of models has been growing. Neural network model sizes vary greatly based on use case and minimum desired level of accuracy. For example, small depth-wise separable models such as Mobile Net-SSD, with less than 7 million synaptic weight parameters, are sufficient for modest accuracy pedestrian and vehicle object detection for advanced driver assistance systems (ADAS). Much larger models such as YOLO v3 or R-FCN w/ResNet-101 with over 50 million weights may be utilized for higher accuracy object detection for fully autonomous mobility, medical image analytics, etc. Even larger models with 200-400 million weights may be employed for natural language Machine Translation.

Although it would be theoretically possible to build an accelerator ASIC accommodating 400 million weights in memristor cross-bars on a single silicon die (i.e., 3.2/6.4 Gbit at 8-bit/16-bit weight resolution), the die size would rival some of the biggest chips today (e.g., NVidia V100 GPU @ 815 mm2) at low yield, very high cost, large footprint, and supporting only single copy of the biggest models on the die, limiting data and model parallelism and resulting in sub-optimal performance.

To overcome these aforementioned challenges, the disclosed multi-chip interface system 200 extends the DPE architecture to support spanning of the neural network model across multiple silicon DPE dies 250*a*-250*l*, also referred to herein as DPE ASICs. The system 200 enables a modular architecture that is adaptable to a broad range of markets with much smaller chip sizes that can support a large number of weights at low cost (e.g., using a future ASIC supporting up to ~100 million weights). In other words, the number of chips used in a design can be adapted to best suit the complexity, constraints, and performance requirements of the particular DNN-based application. For example, a single chip can be used for embedded markets (ADAS, etc.), two chips on PCIe half-width/half-height form factor accelerator board at 50-75 W can be used for high performance edge systems (including EL-1000/EL-4000 servers or workstations), and four or more chips on standard size PCIe card or dedicated accelerator tray can be used for datacenter applications.

The multi-chip interface system 200 has a scalable architecture that can support larger models. Furthermore, the system 200 can provide a low-power and cost-efficient approach while supporting a large numbers of DPE dies 250*a*-250*l*. In the illustrated example, the system 200 is shown to include at least twelve DPE ASICs 250*a*-250*l*. Also, the system 200 utilizes switch expansions, namely PCIe switch 260, to support communicative links between the multiple DPE ASICs 250*a*-250*l*. As seen in FIG. 2, multiple DPE ASICs can be linked to a single DPE ASIC, which is in turned linked to the PCIe switch 260. For example, DPE ASIC 250*d*, DPE 250*h*, and DPE ASIC 250*l* are linked to the PCIe switch 260. DPE ASIC 250*d* has multiple chips linked to it, namely DPE ASIC 250*a*, 250*b*, and 250*c*. DPE 250*h* is linked to DPE ASIC 205*e*, 250*f*, and 250*g*. In addition, DPE 250*l* is linked to DPE ASIC 205*i*, 250*j*, and 250*k*. Accordingly, each of the DPE ASICs 250*a*-250*l* are communicatively linked to the server processor 241 vis-à-vis the PCIe switch 260. The off-die connections (represented as arrows) between the respective DPE ASICs 250*a*-250*l*, the PCIe switch 260, and the server processor 241 can be implemented as fabric links. In an embodiment, the links are PCIe Gen3 links.

Alternatively, direct links (not shown) between the multiple DPE ASICs 250*a*-250*l* can be implemented as an easy and fast approach. However, due to the scale inefficiencies with respect to cost for larger connectivity in using direct links, use of the PCIe switch 260 may be desirable.

Also, in order to support the off-die interconnects to other DPE ASICs in the multi-chip interconnect system, the DPE ASIC 250*l* may include multiple PCIe root port interfaces 252*a*-252*c*. A PCIe root port interface, for example 252*a*, can serve as an interface between the DPE ASIC 250*l* and another DPE ASIC having a direct interconnect (or fabric link) to DPE ASIC 250*l*. In some embodiments, each PCIe root port interface 252*a*-252*c* corresponds to a link connecting the DPE ASIC 250*l* to a respective DPE ASIC. In the example of FIG. 2, PCIe root port interface 252*a* interfaces to a fabric link to create a chip-to-chip interconnect from DPE ASIC 250*l* to DPE ASIC 250*i*. PCIe root port interface 252*b* interfaces to a different fabric link, creating a chip-to-chip interconnect from DPE ASIC 250*l* to DPE ASIC 250*j*. PCIe root port interface 252*c* interfaces to another fabric link, creating a chip-to-chip interconnect from DPE ASIC 250*l* to DPE ASIC 250*k*.

The DPE ASIC 250*l* also includes an on-die AMBA-AXI switch 207. The AMBA-AXI switch 207 can provide chip-to-chip communication between the DPE ASIC 250*l* and other DPE ASICs that are directly linked thereto. In comparison to the DLASI based system (shown in FIG. 1), the AMBA-AXI switch 207 supports chip-to-chip communication in a manner that is similar to the tile-to-tile communication that is supported by its on-die switch.

Figure 3:
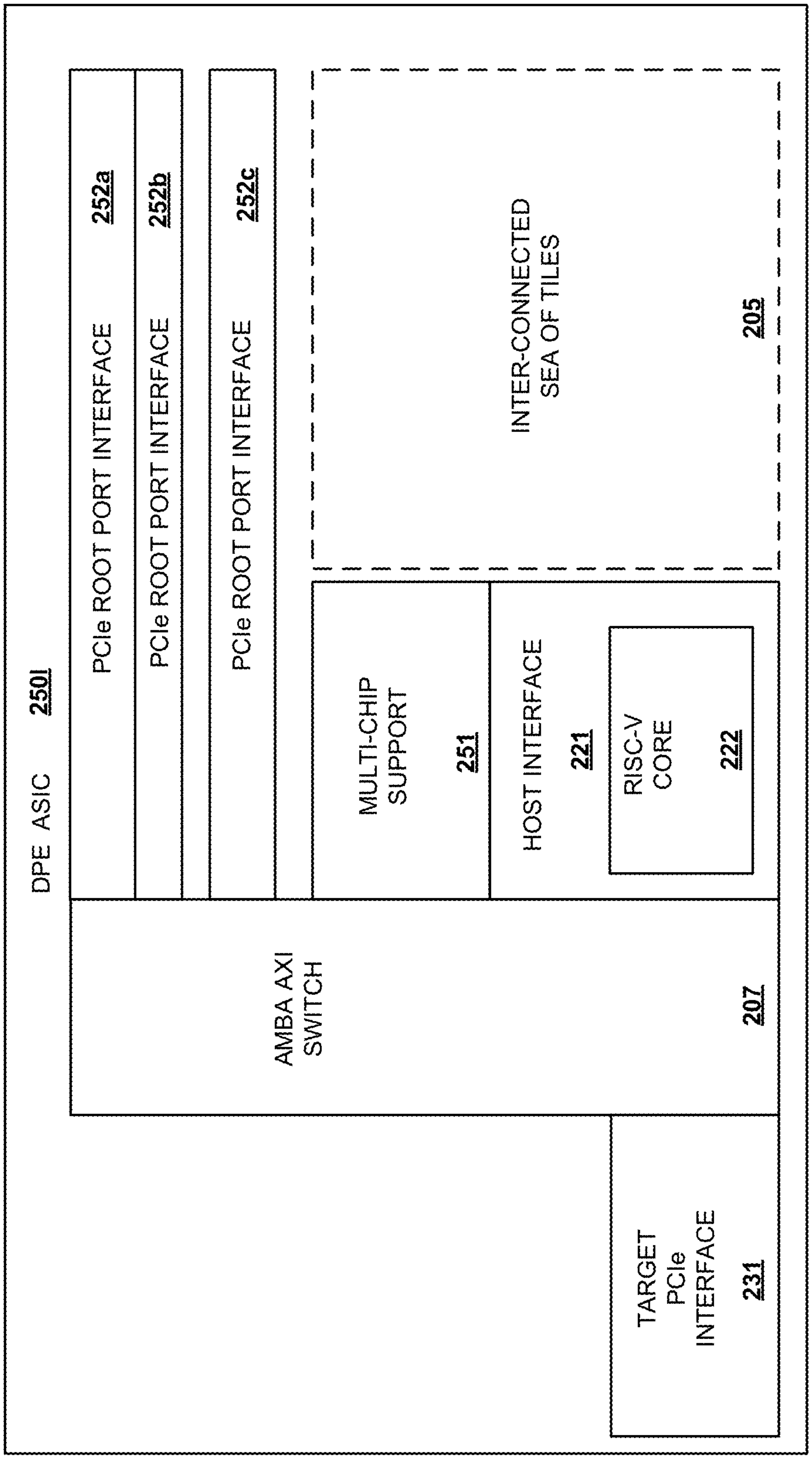
FIG. 3 illustrates an example architecture of a DPE Application Specific Integrated Circuit (ASIC) that can be implemented in the multi-chip interface system of FIG. 2, according to some embodiments.

Turning to FIG. 3, the DPE ASIC 250*l* can also include a target PCIe interface 231. The target PCIe interface 231 may be a high-speed interface for connecting the PDE ASIC 250*l* to a host processor, for example a server processor (shown in FIG. 2). The DPE ASIC 250*l* may be controlled by a host interface 221. Further, the host interface 221 can include a core 222 for processing capabilities. In the illustrated example, core 222 is implemented as a RISC-V core.

Referring back to the DLASI based system (shown in FIG. 1), the system is a hierarchical design that enables multiple tile communication protocols specially designed for Deep Learning Inference accelerator cores and an area-efficient on-die interconnect. However, this DLASI based system relies on tile-to-tile sideband wires to indicate when a tile is ready for new data. Modern VLSI designs with error tolerant fabrics cannot support sideband signals across multiple-chips. Hence, the Deep Learning Inference fabric is extended to have two virtual channels, one channel for high-priority synchronization packets and the other for data communication packets.

In FIG. 3, a single DPE ASIC 250*l* from the multi-chip system 200 (shown in FIG. 2) is prominently shown in order to illustrate the internal components of the ASIC's architecture. In particular, due to the multi-chip design of the system, the DPE ASIC 205*l* includes a multi-chip support block 251 that is not used in the DLASI based system previously described. The multi-chip support block 251 is configured to bridge the demands of off-die interconnect to on-die interconnect. The DPE ASIC's off-die interconnects, namely the PCIe links, are fewer and higher in bandwidth compared with the many low bandwidth on-die links. In order to fully utilize the off-die links, the multi-chip support block 251 is configured to perform buffering for die-to-die packets. To make the flow control simple and compatible with the most commodity fabrics, the flow control within the multi-chip interface system is credit based. Accordingly, the system can efficiently use its chip-to-chip interconnects without introducing overly complicated packet arbitration. Also, the fabric protocol and instruction set architecture support up to 4096 tiles. In an implementation, a multi-chip block can support up to 64 tiles allowing for scaling to accommodate the full range of popular DNN sizes.

The multi-chip scaling does not complicate the higher-level software framework. For example, when a DPE compiler maps a model to the interconnected sea of tiles 205 on the DPE ASIC 250*l*, it can use logical identifications regardless of the hardware topology. This allows seamless mapping from the model definitions provided from higher level framework to the DPE hardware. Once the DPE compiler generates the assembly model with logical tiles, the DPE scheduler software provides the translations to the physical tiles, such as the interconnected sea of tiles 205, which are identified with the combination of chip-id, clump-id, and tile-id. Finally, a DPE loader can transform the assembly code based on the provided translation on-the-fly as it loads the model to the hardware.

Figure 4A:
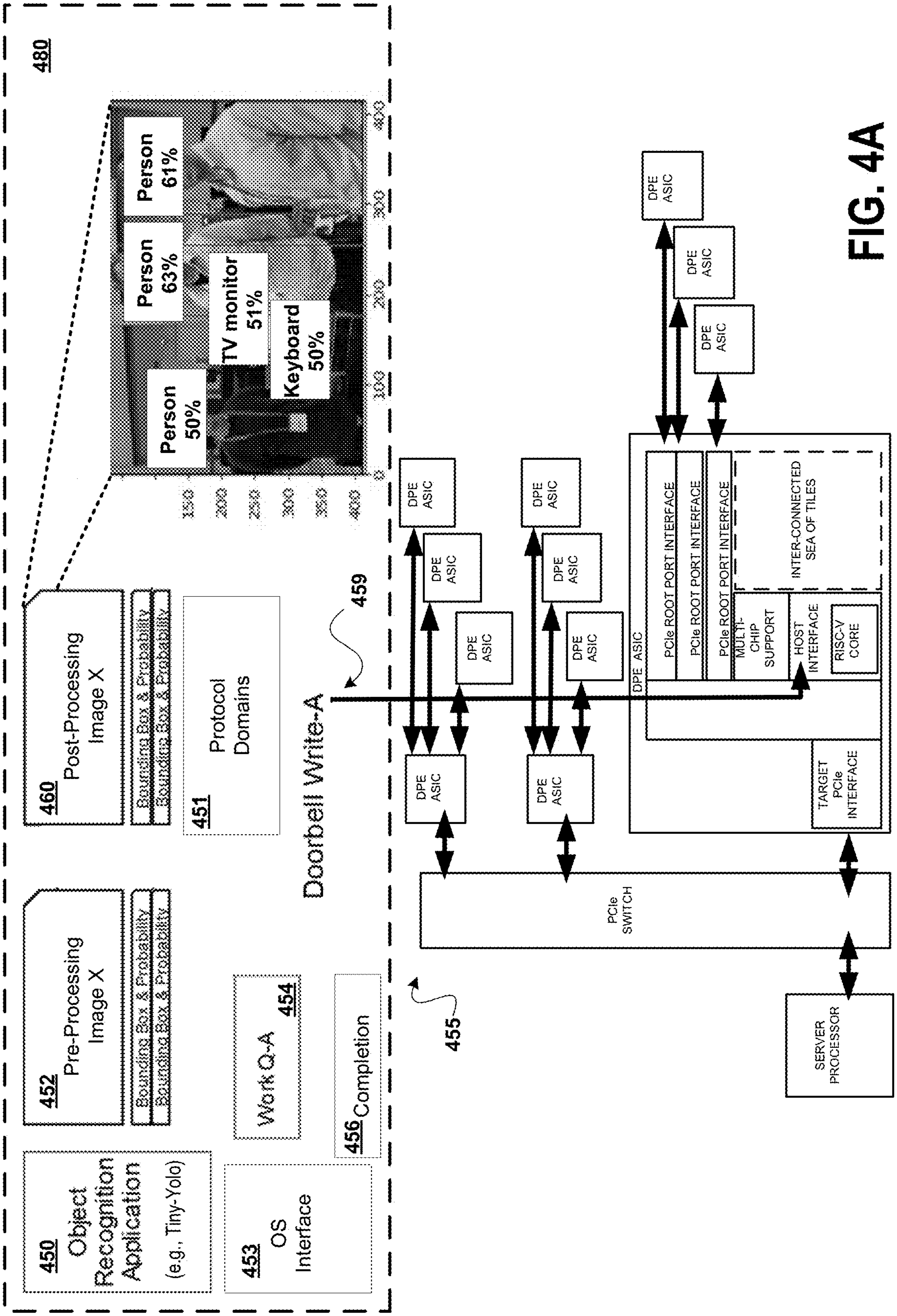
FIG. 4A depicts an example of an object recognition application utilizing the multi-chip interface system of FIG. 2, according to some embodiments.

Referring now to FIG. 4A, an example of an object recognition application executed by a computer system 480 and utilizing the multi-chip interface system 455 (also shown in FIG. 2) is illustrated. The object recognition application 450 can receive an initial image 452 (shown in FIG. 4A as "Pre-Processing Image X"), such as frames of images that are streamed to a host computer in a video format (e.g., 1 MB). Thus, as referred to herein, image 452 refers to a pre-process (e.g., prior to the objection recognition analysis). The image 452 is then sent to be analyzed, using DNN inference techniques, by the multi-chip interface system 455. The example particularly refers to a You Only Look Once (yolo)-tiny-based implementation, which is a type of DNN that can be used for video object recognition applications. In accordance with this example, Yolo-tiny can be mapped onto the multi-chip interface system 455. For instance, the multi-chip interface system 455 can be implemented in hardware as multiple FPGA chips that are capable of performing object recognition on a video stream using the Yolo-Tiny framework as a real-time object detection system.

An OS interface 453 at the host can send a request to analyze the data in a work queue 454. Next, a doorbell 459 can be sent as an indication of the request, being transmitted to the host interface of the multi-chip interface system 455. As used herein, the term "doorbell" refers to a signal commonly in interface communication protocols. The doorbell 459 is a signal used to notify the host controller that input data is available for processing in the host system work queue 454. When work pertaining to image analysis is put into the work queue 454 by the OS interface 453, and the doorbell 459 is rung, the host interface can grab the image data from the queue 454. Furthermore, as the analysis results are obtained from the multi-chip interface system 455, the resulting objects are placed in the completion queue 456, and then transferring into server main memory. The host interface can read the request, then "spoon feed" the images using the bridge and the tiles (and the instructions running therein) which analyze the image data for object recognition. According to the embodiments, the DLI fabric protocol is the mechanism that allows for this "spoon feeding" of work to the tiles to ultimately be accomplished. That is, the fabric protocol and the other multi-chip system components, previously described, link the protocol domain to the hardware domain.

The result of the object recognition application 450 can be a bounding box and probability that is associated with a recognized object. FIG. 4A depicts the post-processing image 460 (shown in FIG. 4A as "Post-Processing Image X") that may result from running the object recognition application 450. Thus, image 452 represents the image before it is processed by the object recognition application, and image 460 represents that image subsequent to being processed by the object recognition application, including the various recognized objects. There are three bounding boxes around objects within the image 460 that have been identified as visual representations of a "person", each having an associated probability shown as "63%", "61%", and "50%". There are also objects in image 160 that are recognized as a "keyboard" at a "50%" probability and "TV monitor" at a "51%" probability.

Figure 4B:
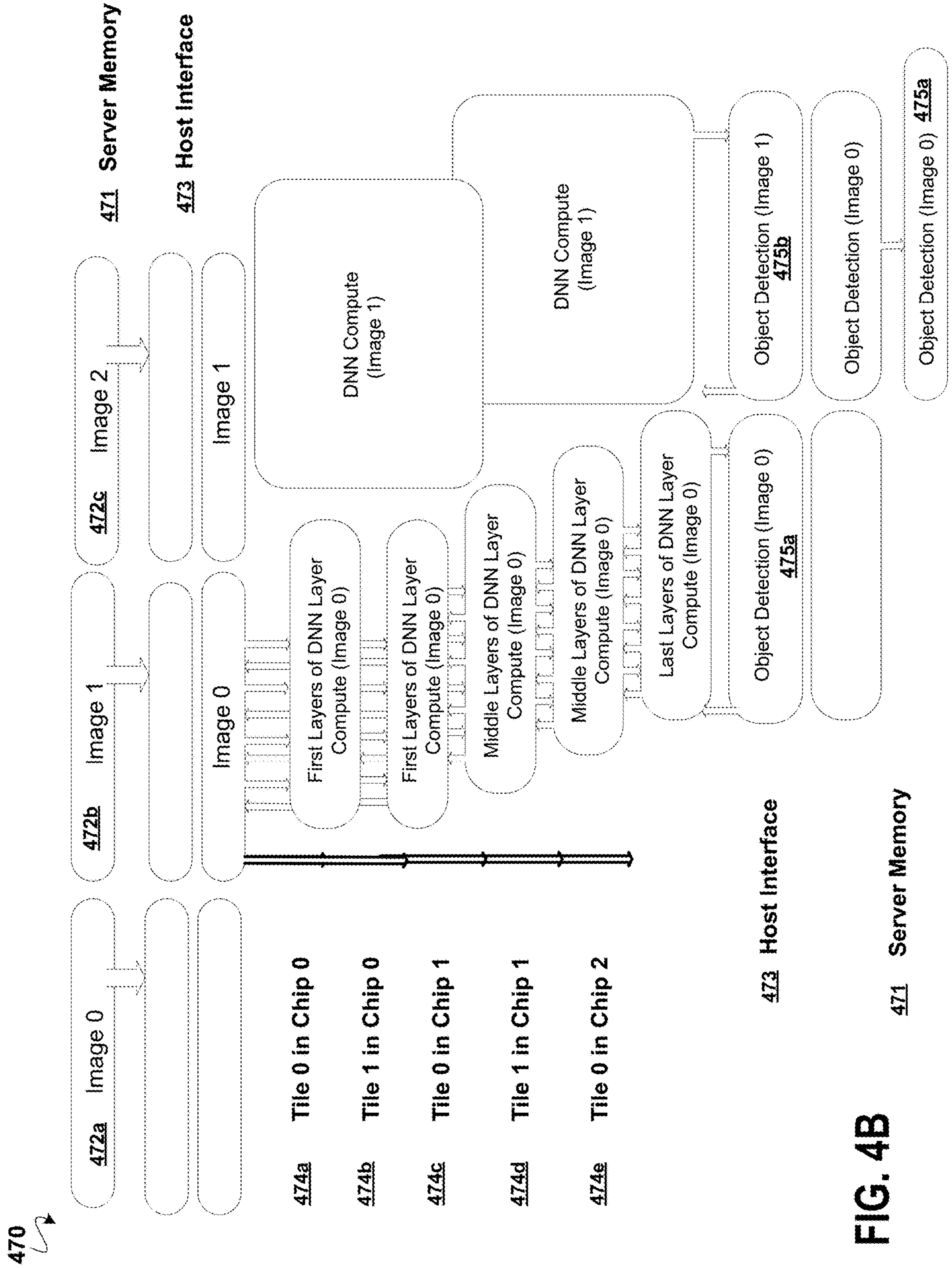
FIG. 4B illustrates an example of tile-level pipelining scheme, allowing the multi-chip interface system of FIG. 2 to coordinate memory access for images, inferences, and output of results, according to some embodiments.

FIG. 4B illustrates an example of tile-level pipelining, allowing different images to be processed concurrently. In detail, FIG. 4B shows the multi-chip interface system coordinating the DMA (Direct Memory Access) transfers of images, inferences, and results. As background, computationally, typical DNN algorithms are largely composed of combinations of matrix-vector multiplication and vector operations. DNN layers use non-linear computations to break the input symmetry and obtain linear separability. Cores are programmable and can execute instructions to implement DNNs, where each DNN layer is fundamentally expressible in terms of instructions performing low level computations. As such, multiple layers of a DNN are typically mapped to the multiple tiles of the multiple chips of the multi-chip system in order to perform computations. Additionally, in the example of FIG. 4B, layers of a DNN for image processing are also mapped to the tiles 474*a*-474*e* of the multi-chip interface system. In the example, the system includes multiple chips, namely chip 0, chip 1, and chip 2, and multiple tiles can be implemented on a respective chip. For instance, chip 0 includes tile 0 474*a* and tile 1 474*b*; chip 1 includes tile 0 474*c*, and tile 1 474*d*; and chip 2 includes tile 0 474*e*. It should be appreciated that the partitioning of tiles between the chips illustrated in FIG. 4B is not intended to be limiting and serves as an example. This partitioning can vary based on the particular implementation, for instance depending on the neural network model size.

As seen, at a server memory level 471, an image 0 472*a*, image 1 472*b*, and an image 2 472*c* are sent as input to be received by the multiple tiles 474*a*-474*e* (on the respective chips) in a pipeline fashion. In other words, the image data may not be sent simultaneously. Rather, the pipelining scheme, as disclosed herein, may stagger the transfer and processing of segments of the image data, shown as image 0 472*a*, image 1 472*b*, and image 2 472*c*. Prior to being received by the tiles 474*a*-474*e*, the images 472*a*-472*c* are received at the host interface level 473. The host interface level 473 transfers image 0 472*a* to the tiles 474*a*-474*e* first. In the example, the inference work performed by the tiles 474*a*-474*e* is shown as follows: tile 0 in chip 0 474*a* and tile 1 in chip 0 474*b* are used to map the first layers of DNN layer compute for image 0 472*a*; tile 0 in chip 1 474*c* and tile 1 in chip 1 474*d* are used to map the middle layers of DNN layer compute for image 0 472*a*; and tile 0 in chip 2 474*e* is used to map the last layers of DNN layer compute for image 0 472*a*. Then, as the pipeline advances, and after completing the compute of the last layer, the object detection for image 0 475*a* may be output to the host interface level 473. At a next interval in the pipeline, that object detection for image 0 475*a* may be transferred to the server memory 471. Furthermore, in accordance with the pipelining scheme, while the object detection for image 0 475*a* is being sent to the server memory 475*a*, the object detection for image 1 475*b* may be transferred to the host interface level 473.

More iterations may be carried out at the early stages of Convolution Neural Network (CNN) than the later stages of the CNN inference. Thus, in some embodiments, additional resources (tiles or cores) may be allocated to these more iterative stages. Overall, image recognition performance may be determined by the pipeline advancement rate, and the pipeline advancement rate may, in some examples, be set by the tile which takes the longest to complete its work. Before the beginning of every pipeline interval, the DNN interface sets up input data and captures the output data.

Figure 5:
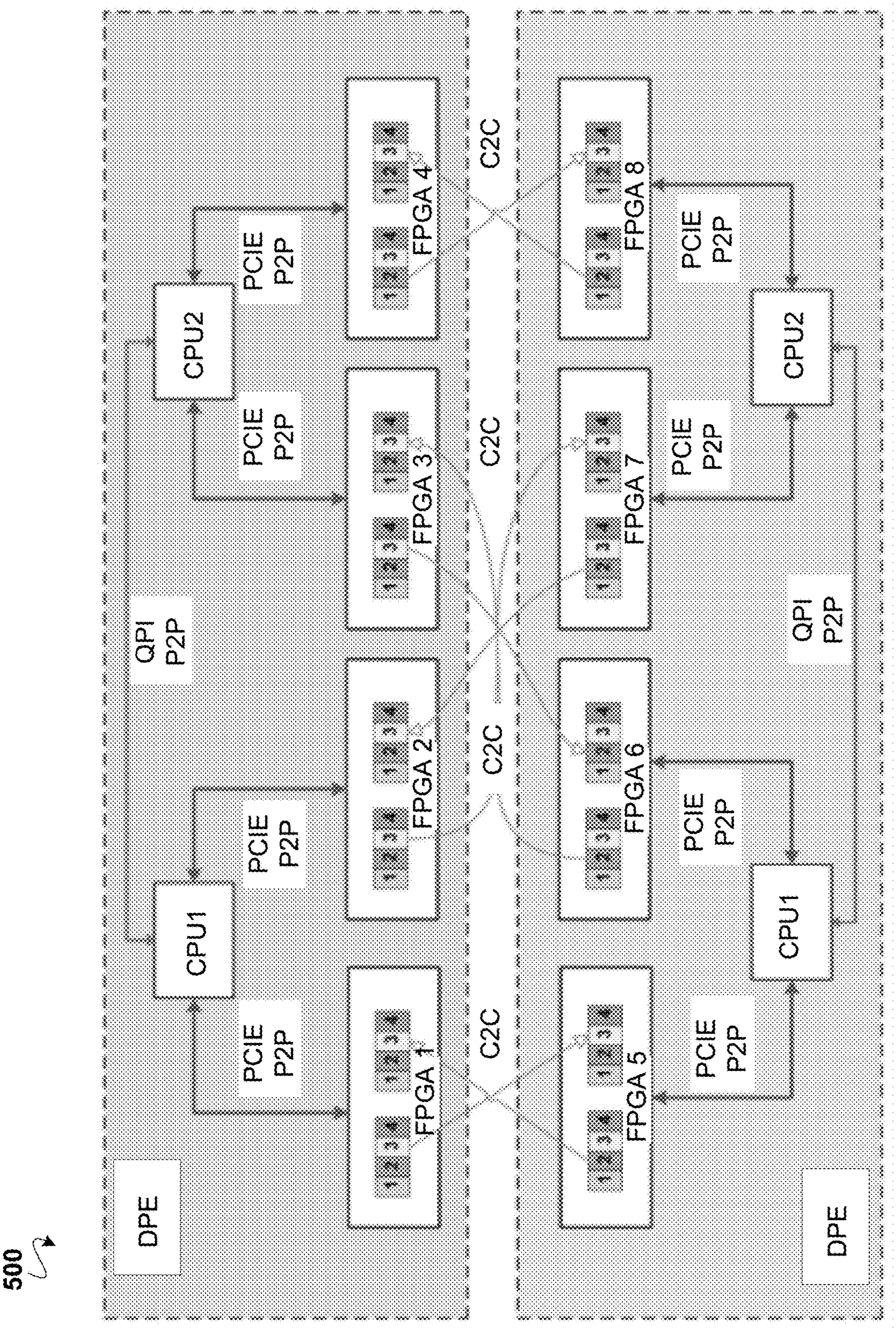
FIG. 5 depicts an example of a field programmable gate array (FPGA)-based emulation setup of the multi-chip interface system of FIG. 2, according to some embodiments.

Referring now to FIG. 5, an example of a FPGA-based multi-chip emulation setup 500, which emulates the hardware of the multi-chip interface system (shown in FIG. 2) is depicted. An FPGA emulator platform can enable running a breath of commonly used neural network models on the DPE FPGA software development framework. Furthermore, neural network spanning is considered a first step towards future composability and virtualization, with software-defined partitioning of many single/multi-tenant inferencing workloads across a pool of accelerators without concern about specific physical hardware association. As shown in FIG. 5, to duplicate the setup 500 of the multi-chips, Xilinx Alveo off-the-self FPGA cards may be utilized. Also, an extended PCIe interface may be used in the setup 500, which was used for host communication for chip-chip communication by taking advantage of the PCIE peer-to-peer capability. To enable an interface that would scale independent of the system level constraints (e.g. lack of PCIe lanes), a chip-to-chip (C2C) connectivity between two FPGA cards is enabled that extends the multi-chip emulation setup 400 across multiple machines and enables the mapping of larger models.

Figure 6:
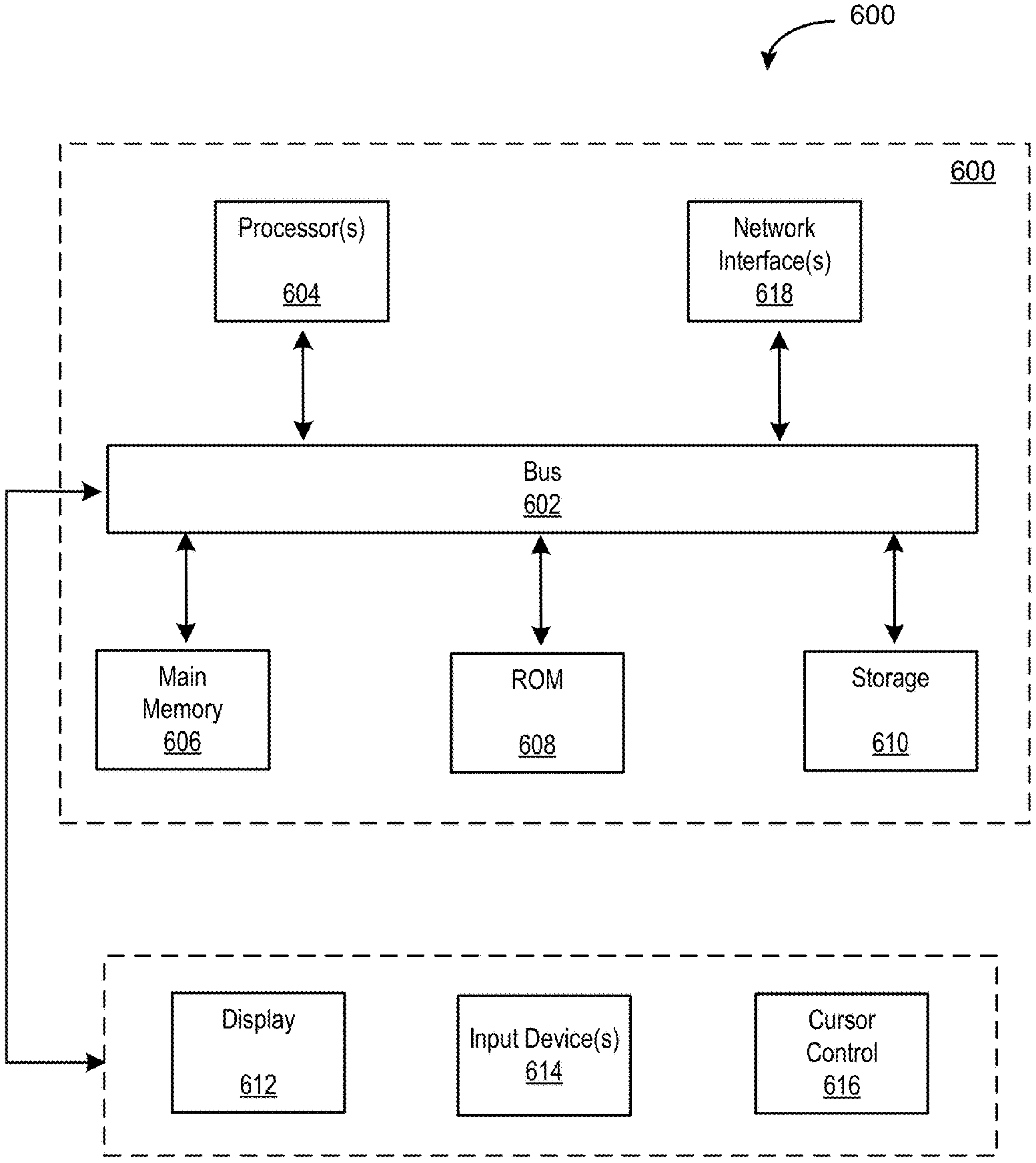
FIG. 6 illustrates an example computer system that may include the multi-chip interface system shown in FIG. 2, according to some embodiments.

FIG. 6 depicts a block diagram of an example computer system 600 in which the multi-chip interface system (shown in FIG. 2), as described herein, may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random-access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes storage devices 610 such as a read only memory (ROM) or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 500 may be coupled via bus 602 to a display 612, such as a liquid crystal display (LCD) (or touch screen), for displaying information to a computer user.

An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word “component,” “engine,” “system,” “database,” data store,” and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term “or” may be construed in either an inclusive or exclusive sense. Moreover, the description of resources, operations, or structures in the singular shall not be read to exclude the plural. Conditional language, such as, among others, “can,” “could,” “might,” or “may,” unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as “conventional,” “traditional,” “normal,” “standard,” “known,” and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as “one or more,” “at least,” “but not limited to” or other like phrases in some instances shall not be read to mean that the narrower case is intended or required in instances where such broadening phrases may be absent.

What is claimed is:

1. A method of pipelining data to multiple tiles of a multi-chip interface, comprising:

initiating an inference operation spanning across a plurality of dot-product engine (DPE) chips of the multi-chip interface;

initiating a pipeline associated with the inference operation, wherein the pipeline comprises a plurality of consecutive intervals;

each of the multiple tiles requesting data during a first successive interval; and as the pipeline advances, a first tile of the multiple tiles on a first DPE chip of the plurality of DPE chips performing a first computation for the inference operation on the requested data, and other tiles of the multiple tiles on a second DPE chip of the plurality of DPE chips and other tiles of the multiple tiles on a third DPE chip of the plurality of DPE chips being idle during a second successive interval of the plurality of intervals.

2. The method of claim 1, wherein the multiple tiles are spanned across the plurality of DPE chips of the multi-chip interface, comprise:

the first DPE chip of the multi-chip interface having corresponding tiles from the multiple tiles thereon;

the second DPE chip of the multi-chip interface having corresponding tiles from the multiple tiles thereon; and the third DPE chip of the multi-chip interface having corresponding tiles from the multiple tiles thereon.

3. The method of claim 2, comprising: as the pipeline further advances, the first tile of the multiple tiles on the first DPE chip completing the first computation for the inference operation on the requested data, a second tile of the multiple tiles on the first DPE chip initiating a second computation for the inference operation on the requested data, and other tiles of the multiple tiles on the second DPE chip and other tiles of the multiple tiles on the third DPE chip waiting during the second successive interval.

4. The method of claim 3, wherein the first tile halts allowing an output from the inference operation to be sent to a host interface of the multi-chip interface.

5. The method of claim 4, comprising: as the pipeline further advances, the second tile of the multiple tiles in the first DPE chip completing the second computation for the inference operation on the requested data, and a first tile of the multiple tiles on the second DPE chip initiating a third computation for the inference operation on the requested data during a third successive interval, and the other tiles of the multiple tiles on the second DPE chip and other tiles of the multiple tiles on the third DPE chip waiting during the third successive interval.

6. The method of claim 5, comprising: as the pipeline further advances, the first tile of the multiple tiles on the second DPE chip completing the third computation for the inference operation on the requested data, and a second tile of the multiple tiles on the second DPE chip initiating a fourth computation for the inference operation on the requested data during a fourth successive interval, and the other tiles of the multiple tiles on the third DPE chip waiting during the fourth successive interval.

7. The method of claim 6, wherein an output tile of the multi-chip interface executes a send instruction to send the output from the inference operation to the host interface.

8. The method of claim 7, wherein the output tile of the multi-chip interface, in response to the send instruction, further executes a barrier instruction to stall the output tile during sending the output from the inference operation to the host interface.

9. The method of claim 8, wherein the send instruction and the barrier instruction is in accordance with a fabric protocol.

10. The method of claim 1, wherein the first DPE chip, the second DPE chip, and the third DPE chip of the multi-chip interface comprises an Application Specific Integrated Circuit (ASIC).

11. The method of claim 1, comprising: as the pipeline further advances, other tiles of the multiple tiles of the second DPE chip and other tiles of the multiple tiles on the third DPE chip performing others computations for the inference operation on the requested data during one or more subsequent successive intervals of the plurality of intervals.

12. The method of claim 1, wherein the first computation is a first layer of the inference operations, wherein the method further comprises: as the pipeline further advances, a first tile of the multiple tiles on the second DPE hip initiating a middle layer of the inference operation on the requested data during a third successive interval, and a first tile of the multiple tiles on the third DPE chip initiating a last layer of the inference operation on the requested data during a fourth successive interval.

13. The method of claim 1, wherein the plurality of consecutive intervals are declared by a host interface, and wherein the method further comprises: when the host interface declares a beginning of a successive next interval, each tile of the multiple tiles sending intermediate data to a next set of tiles performing computations for the inference operation during the next successive interval.

14. A system, comprising:
a plurality of plurality of dot-product engine (DPE) chips;
a memory storing instructions; and
a processor communicatively connected to the memory and configured to execute the instructions to:
initiate an inference operation spanning across the plurality of DPE chips;
initiate a pipeline associated with the inference operation, wherein the pipeline comprises a plurality of consecutive intervals;
requesting, by each of the multiple tiles, data during a first successive interval; and
as the pipeline advances, performing, by a first tile of the multiple tiles on a first DPE chip of the plurality of DPE chips, a first computation for the inference operation on the requested data, wherein other tiles of the multiple tiles on a second DPE chip of the plurality of DPE chips and other tiles of the multiple tiles on a third DPE chip of the plurality of DPE chips are idle during a second successive interval of the plurality of intervals.

15. The system of claim 14, wherein the multiple tiles are spanned across the plurality of DPE chips of the multi-chip interface, comprise:
the first DPE chip of the multi-chip interface having corresponding tiles from the multiple tiles thereon;
the second DPE chip of the multi-chip interface having corresponding tiles from the multiple tiles thereon; and
the third DPE chip of the multi-chip interface having corresponding tiles from the multiple tiles thereon.

16. The system of claim 15, wherein the processor is further configured to execute the instructions to: as the pipeline further advances, complete, by the first tile of the multiple tiles on the first DPE chip, the first computation for the inference operation on the requested data; and initiate, by a second tile of the multiple tiles on the first DPE chip, a second computation for the inference operation on the requested data, wherein other tiles of the multiple tiles on the second DPE chip and other tiles of the multiple tiles on the third DPE chip wait during the second successive interval.

17. The system of claim 16, wherein the first tile halts allowing an output from the inference operation to be sent to a host interface of the multi-chip interface.

18. The system of claim 17, wherein the processor is further configured to execute the instructions to: as the pipeline further advances, complete, by the second tile of the multiple tiles in the first DPE chip, the second computation for the inference operation on the requested data, and initiate, by a first tile of the multiple tiles on the second DPE chip, a third computation for the inference operation on the requested data during a third successive interval, wherein the other tiles of the multiple tiles on the second DPE chip and other tiles of the multiple tiles on the third DPE chip wait during the third successive interval.

19. The system of claim 18, wherein the processor is further configured to execute the instructions to:

as the pipeline further advances, complete, by the first tile of the multiple tiles on the second DPE chip, the third computation for the inference operation on the requested data, and initiate, by a second tile of the multiple tiles on the second DPE chip, a fourth computation for the inference operation on the requested data during a fourth successive interval, wherein the other tiles of the multiple tiles on the third DPE chip wait during the fourth successive interval.

20. The system of claim 19, wherein an output tile of the multi-chip interface executes a send instruction to send the output from the inference operation to the host interface.

* * * * *